Patented Mar. 2, 1943

2,312,700

UNITED STATES PATENT OFFICE 2,312,700

DIAZINE DERIVATIVES

Gaetano F. D'Alelio, Pittsfield, Mass., assignor to General Electric Company, a corporation of New York No Drawing. Application December 12, 1941,
Serial No. 422,721

16 Claims. (Cl. 260—251)

This invention relates to new chemical compounds and more particularly to diazine derivatives. The invention especially is concerned with the production of new and useful diazinyl (more particularly pyrimidyl) hydroxycarbocyclic-carbamyl-alkyl sulfides and diazinyl hydroxycarbocyclicthiocarbamyl-alkyl sulfides.

The diazine derivatives of this invention may be represented graphically by the following general formula:

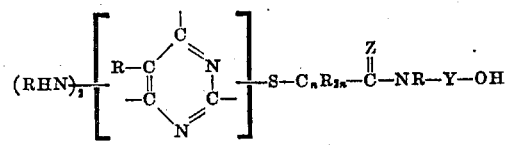

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the hydroxycarbocyclic-carbamyl-alkyl or hydroxycarbocyclicthiocarbamyl-alkyl grouping to the sulfur atom in all cases will be alpha or beta to the hydroxycarbocyclic-carbamyl or -thiocarbamyl grouping. It also will be observed that linkage of the pyrimidyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromopropyl, bromoethyl, bromotolyl, etc. Preferably R in Formula I is hydrogen. However, there also may be produced in accordance with the present invention compounds, such, for instance, as those represented by the general formulas:

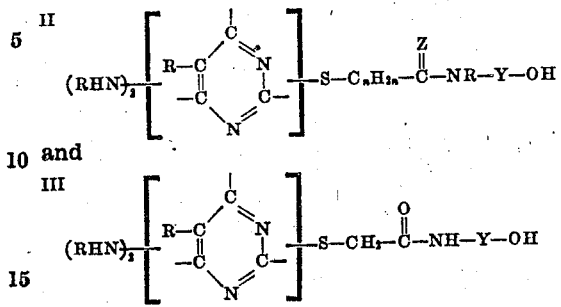

where $n$, Z, Y and R have the same meanings as given above with reference to Formula I.

Illustrative examples of divalent carbocyclic radicals which Y in Formulas I, II and III may represent are: divalent aryl, e. g., phenylene, xenylene, naphthylene, etc.; divalent aliphaticaryl, e. g., 2,5-tolylene, para-(2,3-xylylene), etc.; divalent cycloaliphatic, e. g., cyclopentylene, cyclopentenylene, cyclohexylene, cyclohexenylene, cycloheptylene, etc.; and their homologues, as well as those divalent carbocyclic radicals with one or more of their hydrogen atoms replaced by a substituent, e. g., halogeno, amino, acetyl, acetoxy, carboalkoxy, alkoxy, aryloxy, sulfamyl, alkyl, alkenyl, a hydroxy group or groups in addition to the single —OH group shown in the above formulas, etc. Specific examples of substituted divalent carbocyclic radicals are chlorophenylene, bromophenylene, chloronaphthylene, bromonaphthylene, bromo 2,5-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, sulfamylphenylene, methylphenylene (tolylene), allylphenylene, etc. Preferably Y is phenylene or methylphenylene.

The new compounds of this invention may be used, for example, as pharmaceuticals, plasticizers and as intermediates in the preparation of derivatives thereof such as hydrazo, hydrazino, carbazido, semicarbazido, ureido, carbamyl, acyl, amidine, methylol, etc., derivatives of the individual compound embraced by Formula I. These new organic sulfides are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and are specifically claimed in my copending application Serial No. 425,161, filed December 31, 1941, and assigned to the same assignee as the present invention. These new organic sulfides also may be compounded with rubber, both natural and synthetic, to modify the properties of the rubber.

Various methods may be employed to produce the chemical compounds of this invention. I prefer to prepare them by a process which comprises effecting reaction between a diamino [(—NHR)₂] mercapto pyrimidine and a hydroxycarbocyclic-carbamyl-alkyl halide (or a hydroxycarbocyclicthiocarbamyl-alkyl halide) in the presence of a hydrohalide acceptor, e. g., an alkali-metal hydroxide. When the starting components, proportions thereof and reaction conditions are such that the hydrogen atom of the —OH group of the hydroxycarbocyclic compound is replaced by the residue of the hydrohalide acceptor, e. g., by an alkali metal, the hydroxy compound desired as a final product is obtained by treating this intermediate product with hydrochloric, hydrobromic, sulfuric or other suitable organic or inorganic acid in an amount just sufficient to form the desired hydroxy derivative.

Illustrative examples of mercapto pyrimidines that may be used, depending upon the particular end-product desired, are:

2-mercapto 4,6-diamino pyrimidine
2-mercapto 4,6-diamino 5-methyl pyrimidine
2-mercapto 4,6-di-(methylamino) pyrimidine
2-mercapto 4,6-di-(methylamino) 5-methyl pyrimidine
2-mercapto 4,6-di-(anilino) pyrimidine
2-mercapto 4,6-di-(anilino) 5-butyl pyrimidine
2-mercapto 4-xenylamino 5-cyclopentyl 6-amylamino pyrimidine
2-toluido 4-mercapto 5-cyclohexenyl 6-amino pyrimidine (2-toluido 4-amino 5-cyclohexenyl 6-mercapto pyrimidine)
2-mercapto 4-amino 6-ethylamino pyrimidine
2-mercapto 4,6-di-(propylamino) pyrimidine
2-allylamino 4-mercapto 5-phenyl 6-amino pyrimidine
2-isoamylamino 4-mercapto 6-chlorophenylamino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-isobutylamino 6-cyclopentylamino pyrimidine
2-mercapto 4-(3'-butenylamino) 6-isopropylamino pyrimidine
2-mercapto 4-amino 6-chloroxenylamino pyrimidine
2-mercapto 4-ethylphenylamino 5-naphthyl 6-xylidino pyrimidine
2-mercapto 4-isopropylanilino 5-benzyl 6-benzylamino pyrimidine
2-mercapto 4-phenethylamino 5-(2'-butenyl) 6-cyclopentenylamino pyrimidine
2-mercapto 4,6-diamino 5-bromotolyl pyrimidine
2-mercapto 4-amino 5-phenylisopropyl 6-chlorocyclohexylamino pyrimidine
2-mercapto 4-isobutylamino 6-bromonaphthylamino pyrimidine
2-mercapto 4,6-diamino 5-phenylpropyl pyrimidine
2-mercapto 4-chlorobenzylamino 5-chlorobutyl 6-bromoethylamino pyrimidine
2-mercapto 4-amino 5-ethylchlorophenyl 6-sec.-butylamino pyrimidine
2-mercapto 4-pentylamino 6-cyclohexylamino pyrimidine
2-mercapto 4-n-hexylamino 6-xenylamino pyrimidine
2-mercapto 4-cyclohexenylamino 6-naphthylamino pyrimidine
2-mercapto 4-amino 6-bromoethylamino pyrimidine
2-mercapto 4-amino 6-methylamino pyrimidine
2-mercapto 4-aminoanilino 6-ethylphenylamino pyrimidine
2-mercapto 4-amino 6-benzylamino pyrimidine
2-mercapto 4-chlorocyclopentylamino 6-toluido pyrimidine Illustrative examples of hydroxycarbocyclic-carbamyl-alkyl halides and hydroxycarbocyclic-thiocarbamyl-alkyl halides that may be employed, depending upon the particular end-product sought, are:

Para-hydroxyphenyl-carbamyl chloro methane
Alpha-(para-hydroxyphenyl-carbamyl) beta-chloro ethane
Alpha-(meta-hydroxyphenyl-carbamyl) alpha-chloro ethane
Alpha-(para-hydroxyphenyl-thiocarbamyl) alpha-chloro pentane
Ortho-hydroxyphenyl-(methyl)-carbamyl bromo methane
Alpha-(4-hydroxynaphthyl-[1]-carbamyl) beta-chloro butene
Alpha-(para-hydroxy chloro phenyl-carbamyl) alpha-ethyl beta-phenyl beta-bromo ethane
Hydroxytolyl-carbamyl cyclopentyl chloro methane
Hydroxytolyl-(butyl)-carbamyl bromo methane
Para-hydroxyphenyl-(cyclopentyl)-thiocarbamyl chloro methane
Para-hydroxyphenyl-(chloroethyl)-carbamyl chloro methane
4-hydroxycyclohexyl-(phenyl)-carbamyl chloro methane
Alpha-[para-hydroxy chloro phenyl-(bromophenyl)-thiocarbamyl] alpha-chlorocyclohexenyl beta-chloro ethane
3-hydroxycyclopentyl-carbamyl tolyl chloro methane
Alpha-[4-hydroxy 2-chloro cyclopentyl-(xenyl)-carbamyl] alpha-chloroxylyl beta-chloro ethane
Alpha-(para-hydroxyphenyl-carbamyl) alpha-iodo omega-chloro pentane
Hydroxycyclohexenyl-(phenylisopropyl)-carbamyl chlorocyclopentenyl chloro methane
Alpha-[para-hydroxyxenyl-(isobutylphenyl)-carbamyl] beta-naphthyl beta-bromo ethane
Alpha-[para-hydroxy chloro phenyl-(isopentyl) thiocarbamyl] alpha-ethyl alpha-tolyl beta-phenyl beta-bromo propane Various hydrohalide acceptors may be employed. I prefer to use a hydrohalide acceptor that will react with the mercapto pyrimidine to form a water-soluble salt. Examples of such acceptors are the alkali-metal hydroxides, e. g., sodium hydroxide, potassium hydroxide, etc.; carbonates of inorganic bases, including the carbonates of alkali-metals; organic amines such as tertiary amines, e. g., trimethyl amine, triethyl amine, tributyl amine, pyridine, dimethyl aniline, quinoline, etc.; quaternary ammonium bases, e.

g., tetramethyl ammonium hydroxide, etc.; and the like.

The reaction between the mercapto diamino pyrimidine and the hydroxycarbocyclic-carbamyl-alkyl halide (or hydroxycarbocyclic-thiocarbamyl-alkyl halide) may be carried out in any suitable manner, but preferably is effected in the presence of a suitable solvent or mixture of solvents. Although various solvents and solvent mixtures may be employed, for economic reasons and because of their eminent suitability I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The new chemical compounds of this invention also may be prepared by a process which comprises effecting reaction between a halogenated diamino pyrimidine and a hydroxycarbocyclic-carbamyl mercapto alkane (or a hydroxycarbocyclicthiocarbamyl mercapto alkane) in the presence of a hydrohalide acceptor. This reaction preferably is carried out in the presence of an anhydrous solvent. An anhydrous solvent, e. g., alcohol, is desirable because one of the reactants, namely, the halogenated diamino pyrimidine, is hydrolyzable. The other conditions for preparing the compounds of the invention may be the same as described above with reference to the first-mentioned method of preparation.

Illustrative examples of halogenated diamino pyrimidines that may be used, depending upon the end-product desired, are:

2-chloro 4,6-diamino pyrimidine
2-chloro 4,6-di-(methylamino) pyrimidine
2-chloro 4,6-di-(anilino) pyrimidine
2-bromo 4-amino 6-ethylamino pyrimidine
2-chloro 4,6-di-(propylamino) pyrimidine
2-bromo 4,6-di-(methylamino) 5-methyl pyrimidine
2-chloro 4-methylamino 6-chloroethylamino pyrimidine
2-iodo 4,6-di-(anilino) 5-butyl pyrimidine
2-bromo 4-allylamino 6-butylamino pyrimidine
2-chloro 4-isobutylamino 6-cyclopentylamino pyrimidine
2-chloro 4-(3'-butenylamino) 6-isopropylamino pyrimidine
2-chloro 4-amylamino 6-cyclohexylamino pyrimidine
2-chloro 4-amylamino 5-cyclopentyl 6-xenylamino pyrimidine
2-toluido 4-bromo 5-cyclohexenyl 6-amino pyrimidine (2-toluido 4-amino 5-cyclohexenyl 6-bromo pyrimidine)
2-allylamino 4-chloro 5-phenyl 6-amino pyrimidine
2-isoamylamino 4-chloro 6-chlorophenylamino pyrimidine
2-chloro 4-amylamino 6-cyclohexylamino pyrimidine
2-chloro 4-n-hexylamino 6-xenylamino pyrimidine
2-bromo 4-cyclohexenylamino 5-chlorocyclohexenyl 6-naphthylamino pyrimidine
2-chloro 4-chlorocyclopentylamino 6-toluido pyrimidine
2-dichloroanilino 4-chloro 5-tolyl 6-propylamino pyrimidine
2-chloro 4-amino 6-chloroxenylamino pyrimidine
2-chloro 4-ethylphenylamino 5-naphthyl 6-xylidino pyrimidine
2-chloro 4-isopropylanilino 5-benzyl 6-benzylamino pyrimidine
2-bromo 4-phenethylamino 5-(2'-butenyl) 6-cyclopentenylamino pyrimidine
2-chloro 4,6-diamino 5-bromotolyl pyrimidine
2-bromo 4-amino 5-phenylisopropyl 6-chlorocyclohexylamino pyrimidine
2-chloro 4-bromonaphthylamino 6-isobutylamino pyrimidine
2-chloro 4,6-diamino 5-phenylpropyl pyrimidine
2-chloro 4-bromoethylamino 5-chlorobutyl 6-chlorobenzylamino pyrimidine
2-chloro 4-amino 5-chloroethylphenyl 6-sec.-butylamino pyrimidine
2-iodo 4-amino 6-bromoethylamino pyrimidine
2-bromo 4-dichloroanilino 6-chloroethylamino pyrimidine
2-chloro 4-bromotoluido 6-benzylamino pyrimidine
2-chloro 4-aminoanilino 6-ethylamino pyrimidine
2-chloro 4-phenylchloroethylamino 6-phenethylamino pyrimidine
2-chloro 4-chlorocycloheptylamino 6-isopropylamino pyrimidine
2-chloro 4-isopropylanilino 6-phenylpropylamino pyrimidine Illustrative examples of hydroxycarbocyclic-carbamyl mercapto alkanes and of hydroxycarbocyclic-thiocarbamyl mercapto alkanes that may be used, depending upon the particular end-product desired, are:

Para-hydroxyphenyl-carbamyl mercapto methane
Alpha-(para - hydroxyphenyl - carbamyl) beta-mercapto ethane
Alpha-(meta - hydroxyphenyl-carbamyl) alpha-mercapto ethane
Alpha-(para-hydroxyphenyl - thiocarbamyl) alpha-mercapto pentane
Ortho-hydroxyphenyl-(methyl)-carbamyl mercapto methane
Alpha-(4-hydroxynaphthyl-[1]-carbamyl) beta-mercapto butene
Alpha-(para-hydroxy chloro phenyl-carbamyl) alpha-ethyl beta-phenyl beta-mercapto ethane
Hydroxytolyl - carbamyl - cyclopentyl mercapto methane
Hydroxytolyl-(butyl)-carbamyl mercapto methane
Para-hydroxyphenyl - (cyclopentyl) - thiocarbamyl mercapto methane
Para - hydroxyphenyl - (chloroethyl) - carbamyl mercapto methane
4-hydroxycyclohexyl - (phenyl) - carbamyl mercapto methane
3-hydroxycyclopentyl-carbamyl tolyl mercapto methane
Alpha - [para - hydroxy chlorophenyl - (bromophenyl) - thiocarbambyl] alpha - chlorocyclohexenyl beta-mercapto ethane
Alpha-[hydroxy bromo cyclopentyl - (xenyl) - carbamyl] alpha-(chloroxylyl) beta-mercapto ethane
Alpha-(para-hydroxyphenyl carbamyl) alpha-mercapto omega-chloro pentane
Hydroxycyclohexenyl - (phenylisopropyl) - carbamyl cyclopentenyl mercapto methane
Alpha-[para-hydroxyxenyl - (butylphenyl)-carbamyl] beta-naphthyl beta-mercapto ethane Alpha-[para-hydroxy chloro phenyl-(isopentyl)-thiocarbamyl] alpha-ethyl alpha-tolyl beta-phenyl beta-mercapto ethane In order that those skilled in the art better may understand how the present invention may be carried into effect, the following illustrative examples are given. All parts are by weight.

*Example 1*

This example illustrates the preparation of 4,6-diamino pyrimidyl-2 para-hydroxyphenyl-carbamyl-methyl sulfide, the formula for which is IV
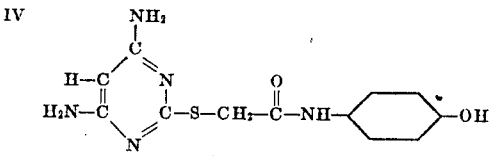

| | Parts |
|---|---|
| 2-mercapto 4,6-diamino pyrimidine | 142 |
| Para-(chloroacetamido) phenol | 185 |
| Sodium hydroxide | 40 |

The sodium hydroxide was dissolved in 1,000 parts water and the 2-mercapto 4,6-diamino pyrimidine was then added. The mixture was stirred until a clear solution resulted. The para-(chloroacetamido) phenol (para-hydroxyphenyl-carbamyl chloro methane) was added to this solution and the resulting mixture then was heated on a steam plate. A visible reaction was noticeable. After heating for a short period, the reaction vessel was removed from the steam plate and the reaction was allowed to continue at room temperature for several hours while stirring. A precipitate settled from the reaction solution on standing. The precipitated solid comprising 4,6-diamino pyrimidyl-2 para-hydroxyphenyl-carbamyl-methyl sulfide was removed by filtration and then washed free of soluble salts. The residue was dried for several hours. The yield of dried product was approximately 92% of the theoretical amount obtainable.

The para-(chloroacetamido) phenol used as a reactant in preparing the compound of this example is a very powerful vesicant. In marked contrast the 4,6-diamino pyrimidyl-2 para-hydroxyphenyl-carbamyl-methyl sulfide has little or no irritating characteristics.

When the sodium hydroxide (hydrohalide acceptor) is employed in substantially larger amount than that used in the above formula, the sodium salt of the 4,6-diamino pyrimidyl-2 para-hydroxyphenyl-carbamyl-methyl sulfide forms as an intermediate product. The desired hydroxy derivative then is obtained by adding an acid, for example hydrochloric acid, to the solution of this sodium salt in an amount sufficient to render the solution neutral to litmus.

*Example 2*

2,6-diamino pyrimidyl-4 para-hydroxyphenyl-carbamyl-methyl sulfide is produced in essentially the same manner as described under Example 1 with the exception that 142 parts 4-mercapto 2,6-diamino pyrimidine is used instead of 142 parts 2-mercapto 4,6-diamino pyrimidine.

*Example 3*

4,6-diamino pyrimidyl-2 para-hydroxyphenyl-thiocarbamyl-methyl sulfide is produced in essentially the same manner as set forth under Example 1 with the exception that, instead of para-(chloroacetamido) phenol, an equivalent amount of para-(chlorothioacetamido) phenol is employed.

*Example 4*

4,6-di-(methylamino) pyrimidyl-2 para-hydroxyphenyl-carbamyl-methyl sulfide is prepared in essentially the same manner as described under Example 1 with the exception that, instead of 2-mercapto 4,6-diamino pyrimidine, an equivalent amount of 2-mercapto 4,6-di-(methylamino) pyrimidine is employed.

*Example 5*

4,6-diamino pyrimidyl-2 alpha- or beta-(para-hydroxyphenyl-carbamyl) ethyl sulfide is prepared in essentially the same manner as described under Example 1 with the exception that, instead of para-(chloroacetamido) phenol, an equivalent amount of alpha-(para-hydroxyphenyl-carbamyl) alpha- or beta-chloro ethane is employed.

*Example 6*

This example illustrates the preparation of 4,6-diamino pyrimidyl-2 ortho-hydroxylphenyl-carbamyl-methyl sulfide.

| | Parts |
|---|---|
| 2-mercapto 4,6-diamino pyrimidine | 142 |
| Ortho-(chloroacetamido) phenol | 185 |
| Sodium hydroxide | 43 |

The above components were added to 2,500 parts cold water. The mixture was stirred thoroughly for 3 hours. A visible reaction was noticeable and a solid precipitate formed. The precipitated solid comprising 4,6-diamino pyrimidyl-2 ortho-hydroxyphenyl-carbamyl-methyl sulfide was removed by filtration and then washed free of soluble salts. The residue was dried for several hours. The yield of dried product was approximately 90% of the theoretical amount obtainable. The compound of this example, like the product of Example 1, lacked the vesicant characteristics of the ortho-(chloroacetamido) phenol from which it was prepared.

When the sodium hydroxide is employed in substantially larger amount than that used in the above formula, the sodium salt of the 4,6-diamono pyrimidyl-2 ortho-hydroxyphenyl-carbamyl-methyl sulfide is formed as an intermediate product. The desired hydroxy derivative then is obtained by adding an acid, for example hydrochloric acid, to the solution of this sodium salt in an amount sufficient to render the solution neutral to litmus.

*Example 7*

4,6-diamino pyrimidyl-2 ortho-hydroxytolyl-carbamyl-methyl sulfide is prepared in essentially the same manner as described under Example 2 with the exception that, instead of ortho-(chloroacetamido) phenol, an equivalent amount or ortho-hydroxytolyl-carbamyl chloro methane is employed.

Illustrative examples of other compounds of this invention, and which may be prepared as hereinbefore described are:

4,6-diamino pyrimidyl-2 meta-hydroxyphenyl-carbamyl-methyl sulfide 2,6-diamino pyrimidyl-4 ortho-hydroxyphenyl-carbamyl-methyl sulfide.

2,6-diamino pyrimidyl-4-meta-hydroxyphenyl-carbamyl-methyl sulfide 4,6-diamino pyrimidyl-2 ortho-hydroxyphenyl-thiocarbamyl-methyl sulfide 4,6-diamino pyrimidyl-2 meta-hydroxyphenyl-thiocarbamyl-methyl sulfide 4,6-diamino pyrimidyl-2 meta-hydroxytolyl-carbamyl-methyl sulfide 4,6-diamino pyrimidyl-2 para-hydroxytolyl-carbamyl-methyl sulfide 2,6-diamino pyrimidyl-4 ortho-hydroxytolyl-carbamyl-methyl sulfide 2,6-diamino pyrimidyl-4 meta-hydroxytolyl-carbamyl-methyl sulfide 2,6-diamino pyrimidyl-4 para-hydroxytolyl-carbamyl-methyl sulfide 4,6-di-(methylamino) pyrimidyl-2 ortho-hydroxyphenyl-carbamyl-methyl sulfide 4,6-di-(methylamino) pyrimidyl-2 meta-hydroxyphenyl-carbamyl-methyl sulfide 2,6-di-(methylamino) pyrimidyl-4 para-hydroxyphenyl-carbamyl-methyl sulfide 4,6-di-(methylamino) pyrimidyl-2 para-hydroxyphenyl-thiocarbamyl-methyl sulfide 4,6-diamino pyrimidyl-2 alpha-(ortho-hydroxyphenol-carbamyl-ethyl) sulfide 4,6-diamino pyrimidyl-2 alpha-(meta-hydroxyphenyl-carbamyl-ethyl) sulfide 4,6-diamino pyrimidyl-2 beta-(ortho-hydroxyphenyl-carbamyl-ethyl) sulfide 4,6-diamino pyrimidyl-2 beta-(meta hydroxyphenyl-carbamyl-ethyl) sulfide 2,6-diamino pyrimidyl-4 alpha-(para-hydroxyphenyl-carbamyl-ethyl) sulfide 2,6-diamino pyrimidyl-4 beta-(para-hydroxyphenyl-carbamyl-ethyl) sulfide 4,6-diamino pyrimidyl-2 alpha-(ortho-hydroxyphenyl-thiocarbamyl-ethyl) sulfide 4,6-diamino pyrimidyl-2 beta-(ortho-hydroxyphenyl-thiocarbamyl-ethyl) sulfide 4,6-diamino pyrimidyl-2 alpha-(meta-hydroxyphenyl-thiocarbamyl-ethyl) sulfide 4,6-diamino pyrimidyl-2 beta-(meta-hydroxyphenyl-thiocarbamyl-ethyl) sulfide 4,6-diamino pyrimidyl-2-alpha-(para-hydroxyphenyl-thiocarbamyl-ethyl) sulfide 4,6-diamino pyrimidyl-2 beta-(para-hydroxyphenyl-thiocarbamyl-ethyl) sulfide 2,6-diamino pyrimidyl-4 alpha-(para-hydroxyphenyl-thiocarbamyl-ethyl) sulfide 2,6-diamino pyrimidyl-4 beta-(parahydroxyphenyl-thiocarbamyl-ethyl) sulfide 4,6-diamino pyrimidyl-2 alpha-(ortho-hydroxytolyl-carbamyl-ethyl) sulfide 4,6-diamino pyrimidyl-2 alpha-(meta-hydroxytolyl-carbamyl-ethyl) sulfide 4,6-diamino pyrimidyl-2 alpha-(para-hydroxytolyl-carbamyl-ethyl) sulfide 4,6-diamino pyrimidyl-2 beta-(ortho-hydroxytolyl-carbamyl-ethyl) sulfide 4,6-diamino pyrimidyl-2 beta-(meta-hydroxytolyl-carbamyl-ethyl) sulfide 4,6-diamino pyrimidyl-2 beta-(para-hydroxytolyl-carbamyl-ethyl) sulfide 2,6-diamino pyrimidyl-4 alpha-(para-hydroxytolyl-carbamyl-ethyl) sulfide 2,6-diamino pyrimidyl-4 beta-(para-hydroxytolyl-carbamyl-ethyl) sulfide 4,6-diamino pyrimidyl-2 alpha-(para-hydroxytolyl-thiocarbamyl-ethyl) sulfide 2,6-diamino pyrimidyl-4 beta-(ortho-hydroxytolyl-thiocarbamyl-ethyl) sulfide 4,6-diamino 5-ethyl pyrimidyl-2 para-hydroxyphenyl-carbamyl-methyl sulfide 4,6-diamino pyrimidyl-2 alpha-(ortho- hydroxyphenyl-carbamyl-butyl) sulfide 4,6-di-(methylamino) 5 - methyl - pyrimidyl - 2 beta - (para - hydroxyphenyl - carbamyl-ethyl) sulfide 4,6-diamino pyrimidyl-2 5-phenyl ortho-hydroxyphenyl-carbamyl-methyl sulfide 4,6-di-(anilino) 5-butyl pyrimidyl-2 alpha-(meta-hydroxyphenyl-carbamyl - ethyl) sulfide 4-chloroethylamino 6-methylamino pyrimidyl-2 alpha-(para- hydroxyphenyl - thiocarbamyl-pentyl) sulfide 4-xenylamino 5-cyclopentyl 6-pentylamino pyrimidyl-2 ortho-hydroxyphenyl-(methyl)-carbamyl-methyl sulfide 2-toluido 4-amino 5-cyclohexenyl pyrimidyl-6 beta-(4'-hydroxy-naphthyl-[1'] - carbamyl - 3''-butenyl) sulfide 2-allylamino 4-amino 5-phenyl pyrimidyl-6 beta-[para - hydroxy chloro phenyl - carbamyl - (alpha-phenyl beta-ethyl)-ethyl] sulfide 2-pentylamino 4-chlorophenylamino pyrimidyl-6 hydroxytolyl - carbamyl -(cyclopentyl) - methyl sulfide 2-dichloroanilino 4-propylamino 5-tolyl pyrimidyl-6 hydroxytolyl-(butyl)-carbamyl-methyl sulfide 2-cycloheptylamino 4-isobutylamino pyrimidyl-6 para-hydroxyphenyl - (cyclopentyl) - thiocarbamyl-methyl sulfide 4-chloroxenylamino 6-amino pyrimidyl-2 para-hydroxyphenyl-(chloroethyl)-carbamyl-methyl sulfide 4-ethylanilino 5-naphthyl 6-xylidino pyrimidyl-2 hydroxycyclohexyl - (phenyl) - carbamyl-methyl sulfide 4-propylanilino 5-benzyl 6-benzylamino pyrimidyl-2 hydroxycyclopentyl-carbamyl-(tolyl)-methyl sulfide 4-phenethylamino 5-(2'butenyl) 6-cyclopentenylamino pyrimidyl-2 beta-[para-hydroxy chloro phenyl-(bromophenyl)-thiocarbamyl-(beta-chlorocyclohexenyl)-ethyl] sulfide 4,6 - diamino 5 - bromotolyl pyrimidyl - 2 beta-[4'-hydroxy 2'-chloro cyclopentyl-(xenyl)-carbamyl-(beta-chloroxylyl-ethyl] sulfide 4-chlorocyclohexylamino 5-phenylpropyl 6-amino pyrimidyl-2 alpha-[para-hydroxyphenyl-carbamyl-(chloropentyl)-methyl] sulfide 4-butylamino 6-bromonaphthylamino pyrimidyl-2 hydroxycyclohexenyl-(phenylpropyl) - carbamyl-(chlorocyclopentenyl)-methyl sulfide 4-chlorobenzylamino 5-chlorobutyl 6-bromoethylamino pyrimidyl-2 beta-[para-hydroxyxenyl-(butylphenyl)-carbamyl-(alpha-naphthyl)-ethyl] sulfide 4-amino 5-ethylchlorophenyl 6-butylamino pyrimidyl-2 beta-[para-hydroxy chloro phenyl-(isopentyl) -thiocarbamyl - (alpha - phenyl - beta-ethyl beta-tolyl)-propyl] sulfide In a manner similar to that described above with particular reference to the production of hydroxy-carbocycliccarbamyl and thiocarbamyl sulfur derivatives of the 1,3- or meta-diazines (pyrimidines), the corresponding derivatives of the 1,2- or ortho-diazines (pyridazines) and of the 1,4- or para-diazines (pyrazines) may be prepared. It also will be understood by those skilled in the art from the foregoing description of the preparation of a diazine monosulfide

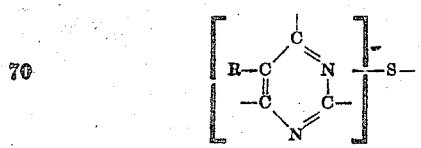

that similar compounds may be prepared in which two or three sulfur atoms are attached directly to a carbon atom of the diazine nucleus, thus:

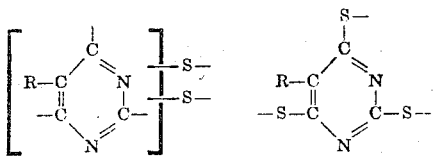

It also will be understood that both the diazinyl mono- and poly-hydroxy (e. g., di-hydroxy, tri-hydroxy) carbocyclic-carbamyl- and thiocarbamyl-methyl and -ethyl sulfides may be prepared as hereinbefore described.

What I claim as new and desire to secure by Letters Patent of the United States is:

1. Chemical compounds corresponding to the general formula

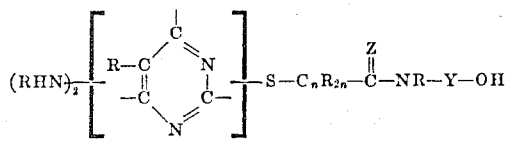

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

2. Chemical compounds as in claim 1 wherein R represents hydrogen.

3. Chemical compounds as in claim 1 wherein R represents hydrogen, Z represents a member of the class consisting of oxygen and sulfur, and $n$ is 1.

4. Chemical compounds corresponding to the general formula

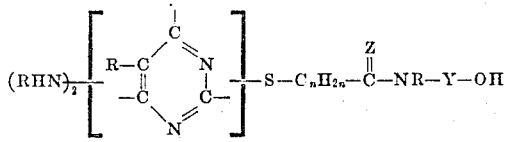

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

5. Chemical compounds corresponding to the general formula

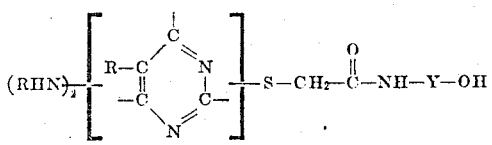

where Y represents a divalent carbocyclic radical, and R represents a member of the class consisting of hydrogen and monovalent hydrocarbon and halo-hydrocarbon radicals.

6. A diamino pyrimidyl hydroxycarbocyclic-carbamyl-methyl sulfide.

7. A diamino pyrimidyl hydroxyphenyl-carbamyl-methyl sulfide.

8. 4,6-diamino pyrimidyl-2 ortho-hydroxyphenyl-carbamyl-methyl sulfide.

9. 4,6-diamino pyrimidyl-2 para-hydroxyphenyl-carbamyl-methyl sulfide.

10. A diamino pyrimidyl hydroxytolyl-carbamyl-methyl sulfide.

11. A 4,6-diamino pyrimidyl-2 hydroxytolyl-carbamyl-methyl sulfide.

12. The method of preparing chemical compounds corresponding to the general formula

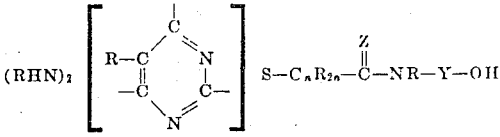

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals, said method comprising effecting reaction, in the presence of a hydrohalide acceptor, between (1) a mercapto pyrimidine corresponding to the general formula

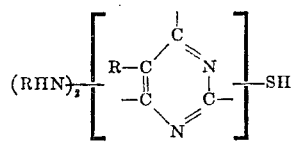

where R has the meaning above given, and (2) a halide corresponding to the general formula

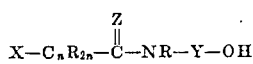

where X represents halogen, and $n$, Z, Y and R have the meanings above given.

13. A method as in claim 12 wherein the hydrohalide acceptor is an alkali-metal hydroxide.

14. The method of preparing a diamino pyrimidyl hydroxyphenyl-carbamyl-methyl sulfide which comprises effecting reaction, in the presence of a hydrohalide acceptor, between a mercapto diamino pyrimidine and a chloroacetamido phenol.

15. The method of preparing 4,6-diamino pyrimidyl-2 para-hydroxyphenyl-carbamyl-methyl sulfide which comprises effecting reaction, in the presence of an alkali-metal hydroxide, between 2-mercapto 4,6-diamino pyrimidine and para-(chloroacetamido) phenol.

16. The method of preparing 4,6-diamino pyrimidyl-2 ortho-hydroxyphenyl-carbamyl-methyl sulfide which comprises effecting reaction, in the presence of an alkali-metal hydroxide, between 2-mercapto 4,6-diamino pyrimidine and ortho-(chloroacetamido) phenol.

GAETANO F. D'ALELIO.